United States Patent [19]
Mungenast et al.

[11] Patent Number: 6,121,975
[45] Date of Patent: Sep. 19, 2000

[54] PATTERN FORMING METHOD AND SYSTEM PROVIDING COMPENSATED REPEAT

[75] Inventors: Heinz Mungenast, Kufstein; Thomas Enk, Neiderndorf, both of Austria

[73] Assignee: Schablonentechnik Kufstein Aktiengesellschaft, Kufstein, Austria

[21] Appl. No.: 08/730,666

[22] Filed: Oct. 11, 1996

[30] Foreign Application Priority Data

Oct. 12, 1995 [EP] European Pat. Off. ............. 95116134

[51] Int. Cl.⁷ .................................................. G06T 17/00
[52] U.S. Cl. ........................................ 345/430; 345/434
[58] Field of Search ................................ 345/433, 430, 345/334, 339, 113, 434

[56] References Cited

U.S. PATENT DOCUMENTS

| | | | |
|---|---|---|---|
| 4,209,780 | 6/1980 | Fenimore et al. | 382/278 |
| 4,545,086 | 10/1985 | Varner | 8/151 |
| 5,194,969 | 3/1993 | DiFrancesco | 358/463 |
| 5,211,692 | 5/1993 | Lalvani | 273/157 R |
| 5,333,430 | 8/1994 | Vidal | 52/311.2 |
| 5,376,802 | 12/1994 | Sakamoto et al. | 250/492.23 |
| 5,450,533 | 9/1995 | Takahashi et al. | 395/117 |
| 5,481,841 | 1/1996 | Osborn | 52/311.2 |
| 5,483,626 | 1/1996 | Nakayama | 345/433 |
| 5,519,819 | 5/1996 | Nakayama | 345/436 |
| 5,751,293 | 5/1998 | Hashimoto et al. | 345/430 |
| 5,810,396 | 9/1998 | Kurata et al. | 285/93 |

FOREIGN PATENT DOCUMENTS

| | | |
|---|---|---|
| 0535895 | 4/1993 | European Pat. Off. . |
| 0535987 | 4/1993 | European Pat. Off. . |

OTHER PUBLICATIONS

WO–A–95 00919—Jan. 5, 1995.
WO–A–92 10904—Jun. 25, 1992.
Sybex Inc., Mastering Windows 3.1, Special Edition, pp. 167–173, 1992.
M.C. Escher, Lizards; Symmetry Drawing 25, India Ink, pencil, watercolor; re–printed from website: <http://www-.WorldOfEscher.com/gallery/Lizards.html>, 1939.

*Primary Examiner*—Mark K. Zimmerman
*Assistant Examiner*—Cliff N. Vo
*Attorney, Agent, or Firm*—Birch, Stewart, Kolasch & Birch, LLP

[57] ABSTRACT

A pattern forming method and system includes producing a repeatable individual pattern within an individual repeat to generate an overall pattern consisting of a plurality of individual patterns. The regions of motifs which project beyond the individual repeat are transferred into the individual repeat in such a way that, when forming the overall pattern, the original motifs are re-formed by joining the individual repeats containing the repeatable individual pattern, to one another, with no discontinuities therein. Any shape that may be repeated can be used to define the individual repeat.

30 Claims, 16 Drawing Sheets

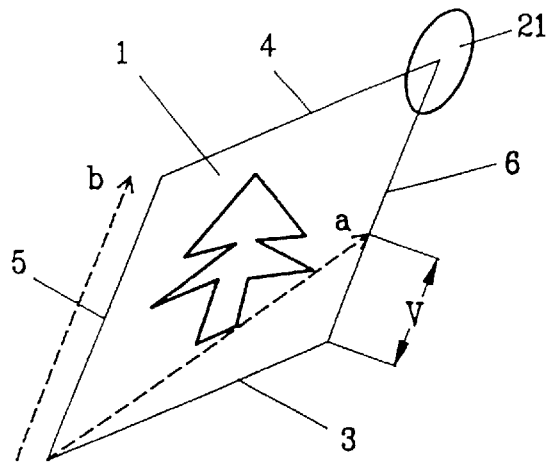
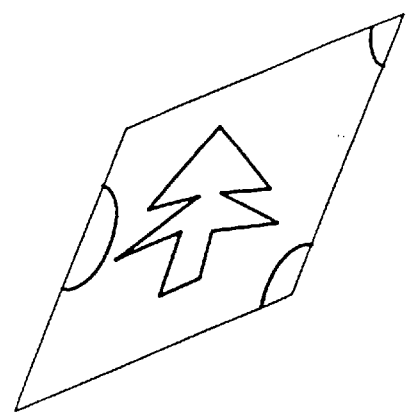
Fig. 13    Fig. 14
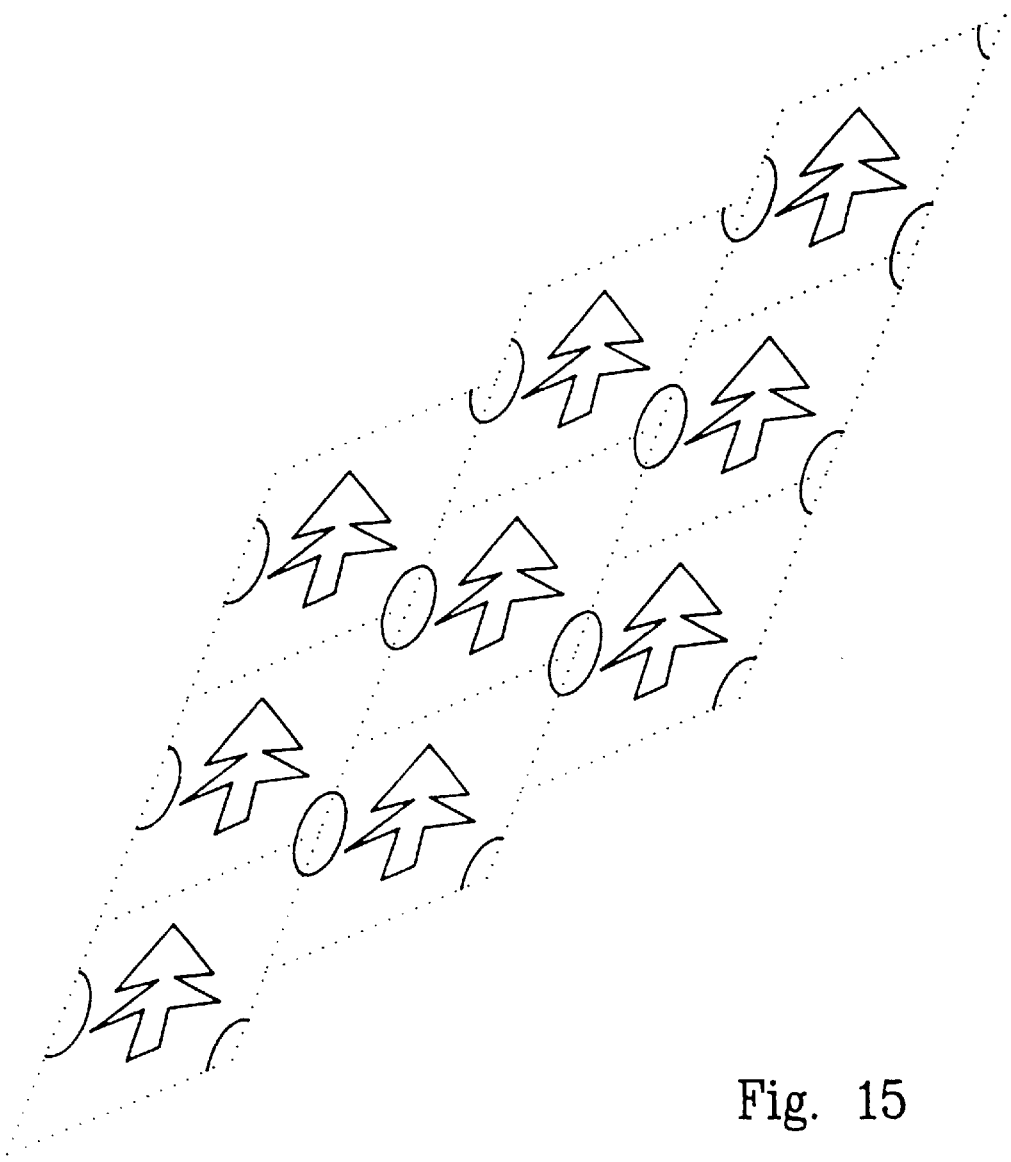
Fig. 15

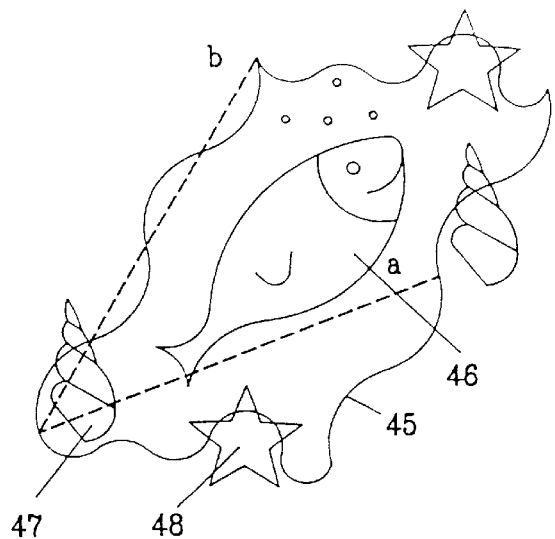
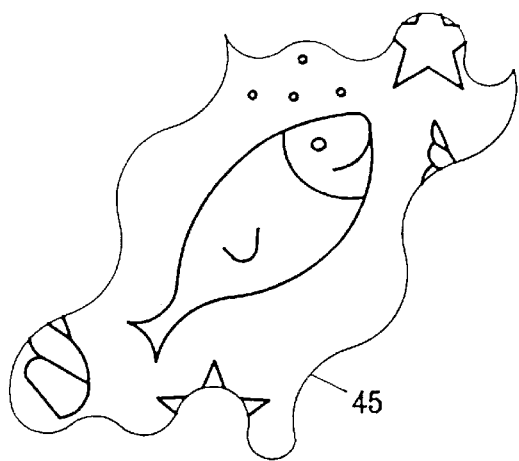
Fig. 25  Fig. 26
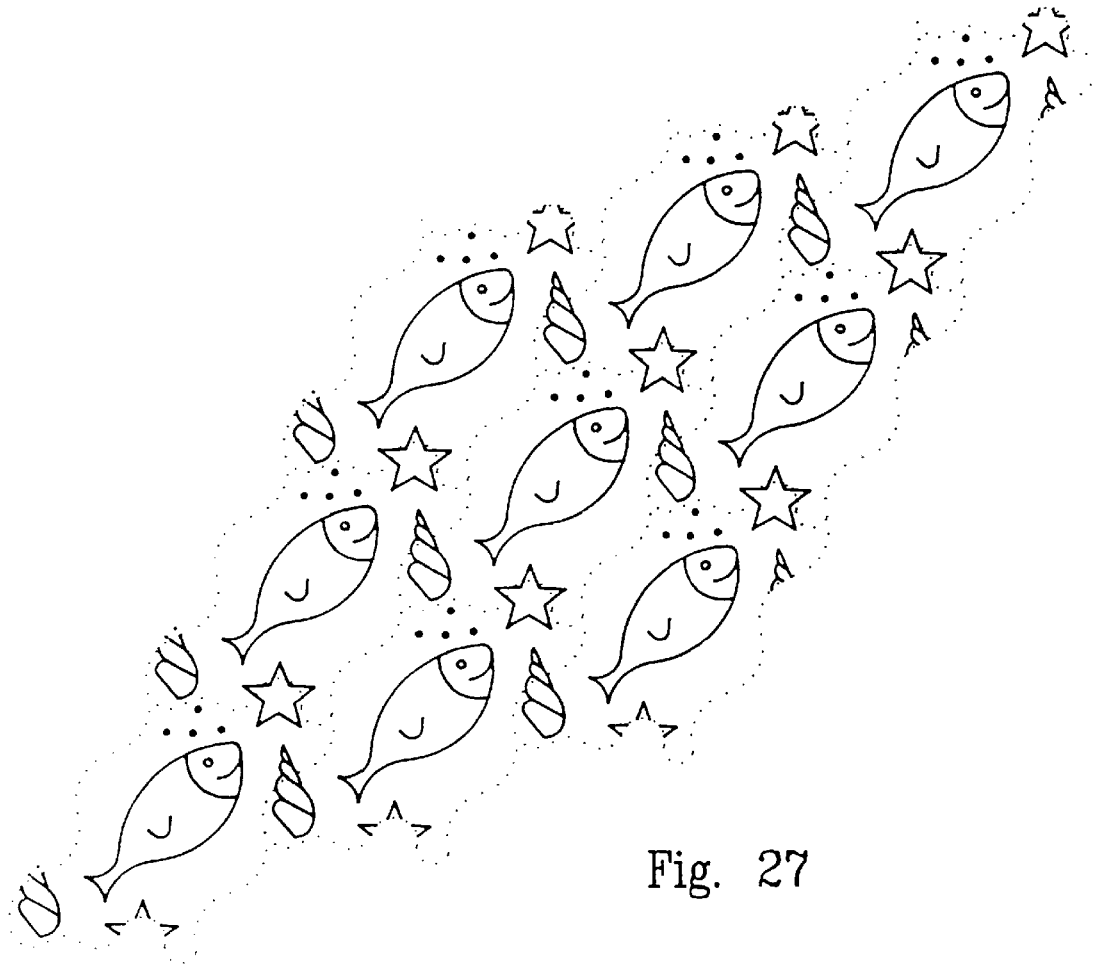
Fig. 27

PATTERN FORMING METHOD AND SYSTEM PROVIDING COMPENSATED REPEAT

BACKGROUND OF THE INVENTION

1. Field of Invention

The invention relates to a pattern forming method and system which are used, in particular, in the area of paper or textile printing. Specifically, the present invention is directed to providing a repeatable pattern from a motif which overlaps one or more individual repeats, such that repetition of the individual repeats recreates the original motif without discontinuities.

2. Description of Related Art

There are already drawing programs for the creation of artistic patterns and drawings on a personal computer or on a work station. Particularly in the textile area and also for the printing of carpets it is common to produce an overall pattern from an original image. The overall pattern fills large areas, always with the same motif, by frequent geometric addition of the original image. However, this process presents difficulties for the addition of the original image at those points at which edges of the original image encounter one another. Here, manual retouching must normally be carried out in order that the image of an overall pattern which everywhere merges uniformly into itself is ensured.

SUMMARY OF THE INVENTION

The invention is based on the object of simplifying repeat pattern formation.

This and other objects of the present invention may be realized by providing a pattern forming method and system which produces a repeatable individual pattern within an individual repeat to generate an overall pattern consisting of a plurality of individual patterns, in which regions of motifs which project beyond the individual repeat are transmitted into the individual repeat in such a way that, when forming the overall pattern, the original motifs are re-formed by joining the individual repeats to one another.

The repeatable individual pattern is preferably created on the screen of a monitor using an electronic computer and is temporarily stored in an electronic memory.

It is thus possible for those regions of a motif which have just been worked on, and which are situated outside the previously defined individual pattern, to be automatically transferred into those regions within the individual repeat on the screen, in which regions they actually come to be situated following the addition, by virtue of the basic geometric addition scheme. The process runs with the aid of a computer and, in general, all the points on the image which have just been altered or added and which are situated outside the individual repeat are transferred to the corresponding image locations within the individual repeat. In this case, the transfer of the regions of motifs which are situated outside the individual repeat into the individual repeat can also be carried out by clicking on a mouse, if the cursor has previously been brought into a motif region which is situated outside the individual repeat.

According to an advantageous refinement of the invention, starting from any arbitrarily selected point within a first individual repeat, at least one vector is formed which points towards the identical point of other individual repeats, into which motifs project which are partly situated in the first individual repeat, the regions of the motifs which are situated in these other individual repeats being displaced, counter to the respective vector direction, by the respective vector magnitude. The number of vectors to be formed in this case corresponds to the number of individual repeats which are adjacent to the first individual repeat and into which motifs originating from the first individual repeat project.

In this case, depending on the type of the motif, the displacement can be carried out counter to the respective vector direction in a plurality of steps, the respective displacement steps being executed in different directions or executed in the same direction, depending on the structure of the motif.

Following the formation of a plurality of mutually adjacent individual repeats, selection of one of the individual repeats and fetching into the individual repeat a motif which also projects into other individual repeats, the computer is able to find automatically the respective vectors which point from a selected point of the selected individual repeat to identical points of the other individual repeats, into which regions of the motif project. Thus, the displacement back of these regions of the motif which are situated outside the selected individual repeat into the selected individual repeat can subsequently also be carried out. The formation of the repeatable individual pattern may therefore be automated to the furthest possible extent, which considerably simplifies the pattern forming.

The repeatable individual pattern can be read out repeatedly from the electronic memory to form the overall pattern, so that very rapid creation of the overall pattern is possible.

For instance, the repeatable individual pattern can be transferred into a stencil blank, in order to form the overall pattern therein.

The stencil blank may be of the kind which is provided with a light-sensitive layer. In this case, the transfer of the repeatable individual pattern into the stencil blank is carried out by exposing the light-sensitive layer. The stencil blank itself may in this case be designed, for example, as a flat or cylindrical screen.

The exposure of the light-sensitive layer can be carried out by a beam from a laser which is switched on and off in coincidence with the image data of the repeatable individual pattern stored in the electronic memory. The light-sensitive layer can be directly removed or evaporated by the laser beam to expose the screen lying thereunder. Alternatively, the laser beam can harden the light-sensitive layer only in regions, when the layer is made of a cross-linkable or polymerizable material. The non-exposed regions are then washed away or removed in a subsequent developing step.

The exposure of the light-sensitive layer of the stencil blank is also possible via a film into which the overall pattern, consisting of a plurality of repeatable individual patterns, has previously been transferred.

However, it is also possible to use as adjusting means electromechanical adjusting means which appropriately deflect the laser beam impinging on the hollow cylinder in the circumferential direction of the hollow cylinder. It is also possible to use further adjusting means to carry out an adjustment of the focus of the laser beam in the radial direction relative to the hollow cylinder as a function of the measured radial positional deviation, in order to compensate for radial form variations of the hollow cylinder from its ideal, circular form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in more detail below with reference to the drawings, in which:

FIG. 13 shows a rhomboid individual repeat having a motif which projects into other individual repeats;

FIG. 14 shows a repeatable individual pattern which has been obtained from the image structure according to FIG. 13;

FIG. 15 shows an overall pattern composed of a plurality of repeatable individual patterns in accordance with FIG. 14;

FIG. 25 shows an example of a selected individual repeat in accordance with FIG. 24 with motifs contained therein which reach adjacent individual repeats;

FIG. 26 shows a repeatable individual pattern obtained from the structure according to FIG. 25;

FIG. 27 shows an overall pattern consisting of a plurality of individual patterns in accordance with FIG. 26 which have been joined together;

DETAILED DESCRIPTION OF THE PREFERRED EMBODIMENTS

Figure 1:
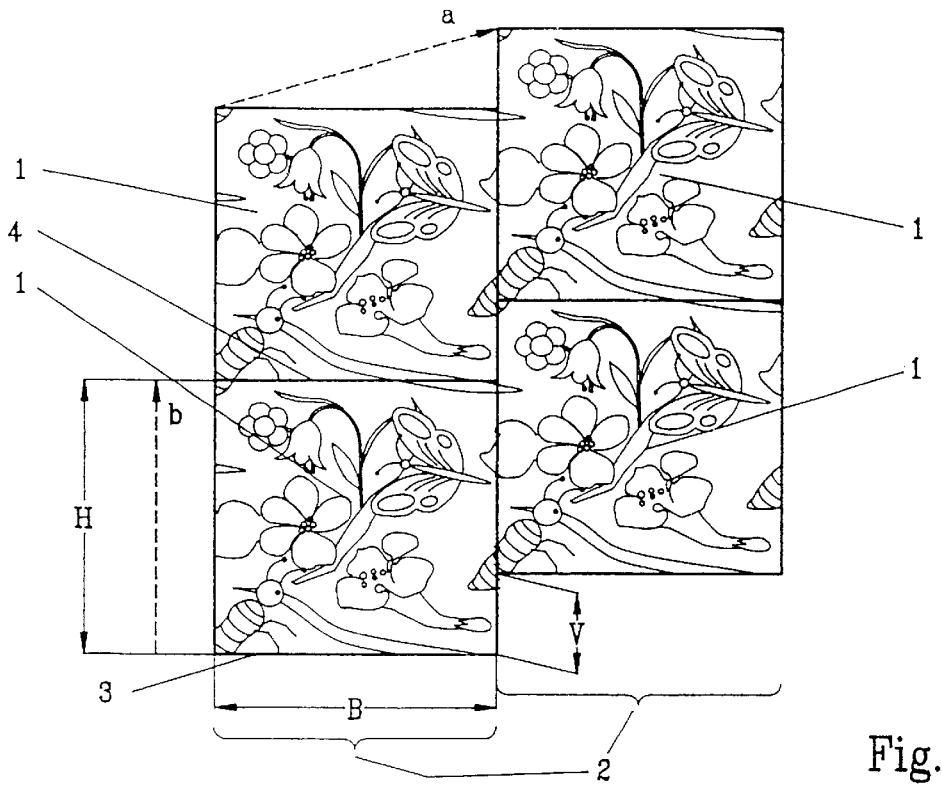
FIG. 1 shows an overall pattern having four individual repeats, in which there are image motifs which project into other individual repeats respectively.

FIG. 1 shows four individual repeats 1, that is to say such sections of an overall pattern as are always filled with the same individual pattern. These individual repeats have a rectangular shape with an individual repeat height H and an individual repeat width B. In addition, adjacent columns 2 are in each case preferably displaced in the vertical direction by a vertical offset V. A multiplicity of individual repeats 1 situated vertically one above the other are referred to as column 2. The pattern which is produced in the case of a geometrical addition of many individuals repeats 1 which are situated adjacent to one another in FIG. 1 have been taken out of such an overall pattern. The vertical offset V may correspond to an arbitrary, not necessarily logical, fraction of the individual repeat height H.

There are several possibilities for conceiving the production of the overall pattern. In the case of one of these concepts, a finite number of individual repeats 1 is first added in the vertical direction. Each individual repeat 1 has a lower repeat edge 3 and an upper repeat edge 4. In particular, the individual repeat is copied and is then joined, in each case offset by the amount H, with its lower repeat edge 3 to the upper repeat edge 4 of the previous individual repeat 1. This initially produces a partial pattern which corresponds to one column 2 of individual repeats. An entire column 2 is now copied and this is displaced horizontally by the individual repeat width B and vertically by the vertical offset V. In the process, such a partial pattern can also be rotated through ninety degrees. The vertical offset V would then occur in the horizontal direction and be designated as the top offset.

According to another concept, the positions of adjacent individual repeats 1 are considered and those vectors are determined by which the individual repeats 1 have been displaced in each case to be able to assume a neighboring position. Two basic vectors a and b point from one of the corner points of an individual repeat 1 to the identical corner point of a directly adjacent individual repeat 1. These basic vectors do not overlap one another and are not parallel to one another. In analytical geometry it is normal to identify this fact by the statement that these basic vectors are linearly independent of one another. All the remaining individual repeats 1 contained in the overall pattern then exhibit a displacement vector in relation to the first individual repeat 1 which corresponds to the relationship $$\vec{v}_{m,n} = \vec{a}\cdot m + \vec{b}\cdot n$$

Here, n and m are arbitrary whole numbers.

Figure 2:
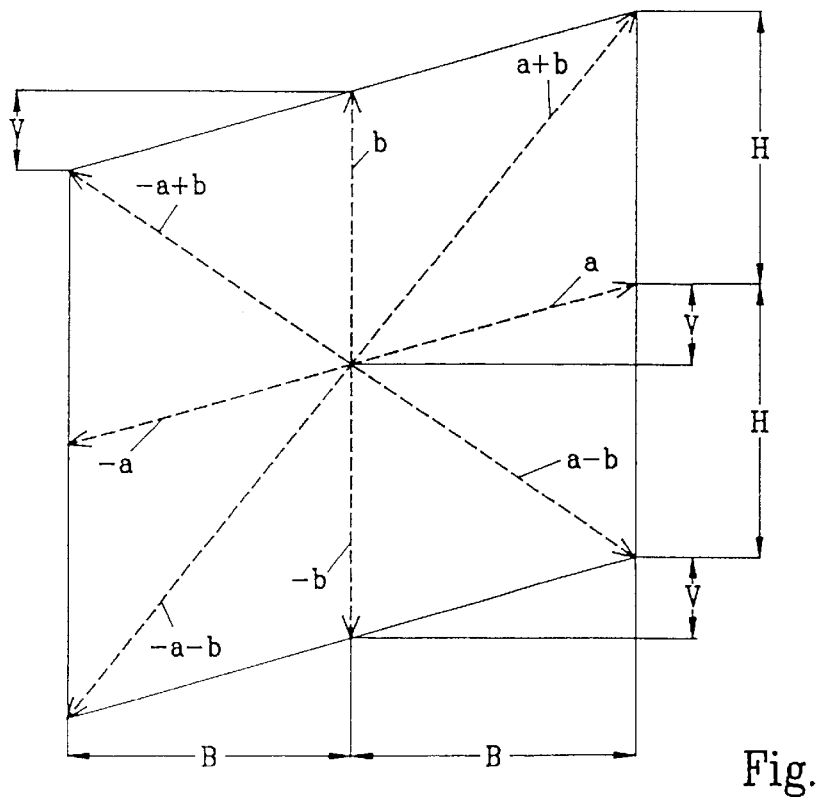
FIG. 2 shows displacement vectors for the image structure according to FIG. 1.

In FIG. 2, the basic vectors, a and b are represented once more. In addition, FIG. 2 shows the two negative vectors −a and −b and the combination vectors a+b, a−b, −a−b and −a+b which are relevant to the further processing. All these vectors have a corresponding function in the creation of the image content or of the repeatable individual pattern in the first individual repeat 1, in accordance with the invention. In order, specifically, that the image content of this first individual repeat 1 can be created in such a way that, during a geometrical addition of a plurality of individual repeats 1 in accordance with the procedure in FIG. 1, no conspicuous image interference points are produced on the edges of the individual repeats, during the drafting of the first individual repeat 1 the image elements or motifs which project over the edges of this individual repeat must be copied and, depending on their original position, must be displaced exactly by one of these vectors a, −a, b, −b, a+b, a−b, −a−b or −a+b.

Figure 3:
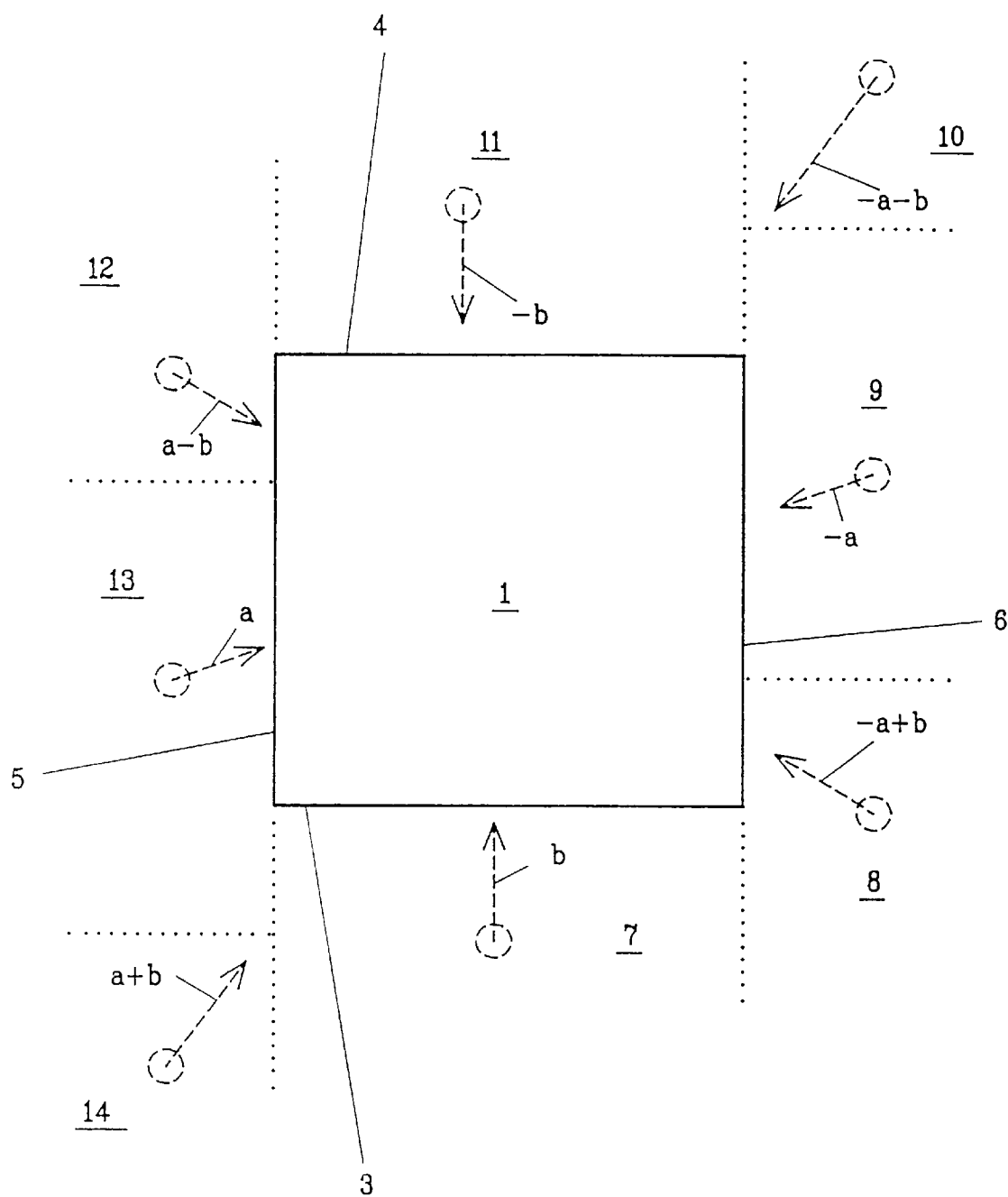
FIG. 3 shows a selected individual repeat with associated displacement vectors for regions of motifs which reach into adjacent individual repeats.

FIG. 3 shows which of the vectors is to be used as a displacement vector for which of the surrounding or adjacent regions of the overall pattern. The individual repeat 1 shown in the center of FIG. 3 is intended to be filled up with a pattern. The designer drafts the pattern by drafting the respective image motifs on the screen and with the aid of a computer, using a graphical entry peripheral (digitizer, mouse, etc.), without taking into account the boundaries of the individual repeat. The size and form of the individual repeat 1 must have been previously defined. It is most beneficial if, as soon as an image point has been fixed or altered, it is copied or transferred to the corresponding location within the individual repeat 1. However, this copy or transfer can also be carried out following the production of a detail of the motif which extends beyond the edge of the individual repeat. This would require a corresponding pre-selection of the mode of operation.

Following the respective entry of a command code, all the image motifs projecting beyond the edges 3 to 6 of the individual repeat are then copied and displaced in accordance with the previously defined individual repeat size and the addition scheme on which it is based. In addition, it is possible to select whether the image motifs which project beyond the edges 3 to 6 and are copied are kept or erased. The outer eight areal regions surrounding the individual repeat 1 are a lower side edge region 7 adjoining the lower image edge 3, a right lower quadrant region 8, a side edge region 9 adjoining a right image edge 6, a right upper quadrant region 10, an upper side edge region 11 adjoining the upper image edge 4, a left upper quadrant region 12, an upper side edge region 13 adjoining a left image edge 5 and a left lower quadrant region 14. In principle, a motif element which extends beyond the edges 3 to 6 can project into any of these regions, each of these regions in turn corresponding to an individual repeat.

An extension by a motif element beyond these outer regions is only possible, however, if the motif element is larger than the previously defined individual repeat 1. This can be prevented by the computer outputting an error message. The motif element is then to be selected to be smaller or else the individual repeat is to be enlarged.

However, there are also cases in which a motif element is, for example, intended to reach over several repeat widths. These motif elements are selected to be narrow in the direction of the height H, so that they can deviate from one another with the aid of the vertical offset V.

Associated with each of these areal regions 7 to 14 is one of the specified vectors a, −a, b, −b, a+b, a−b, −a−b or −a+b. Sections of the image motif which, during the first draft, are situated in the lower side edge region 7, must be displaced by the vector b, those which are situated in the quadrant region 8 are displaced by the vector −a+b, and so on. An overall view of the displacements associated with the edge regions is given in Table 1.

TABLE 1

Edge regions and associated displacements

| Edge region: | Displacement vector: |
| --- | --- |
| Lower side edge region 7 | +b |
| Upper side edge region 11 | −b |
| Right side edge region 9 | −a |
| Left side edge region 13 | +a |
| Left lower quadrant region 14 | a + b |
| Right lower quadrant region 8 | −a + b |
| Right upper quadrant region 10 | −a − b |
| Left upper quadrant region 12 | a − b |

Figure 4:
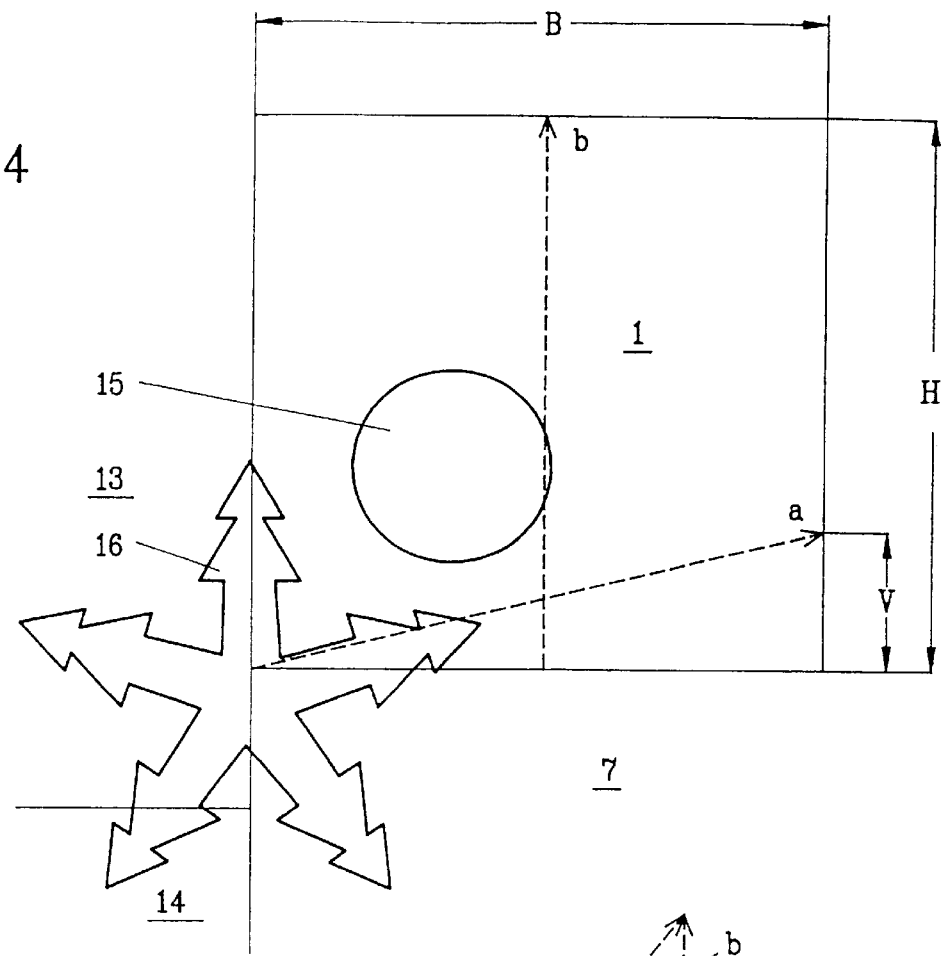
FIG. 4 shows an individual repeat having two motifs, of which one reaches into adjacent individual repeats.
Figure 5:
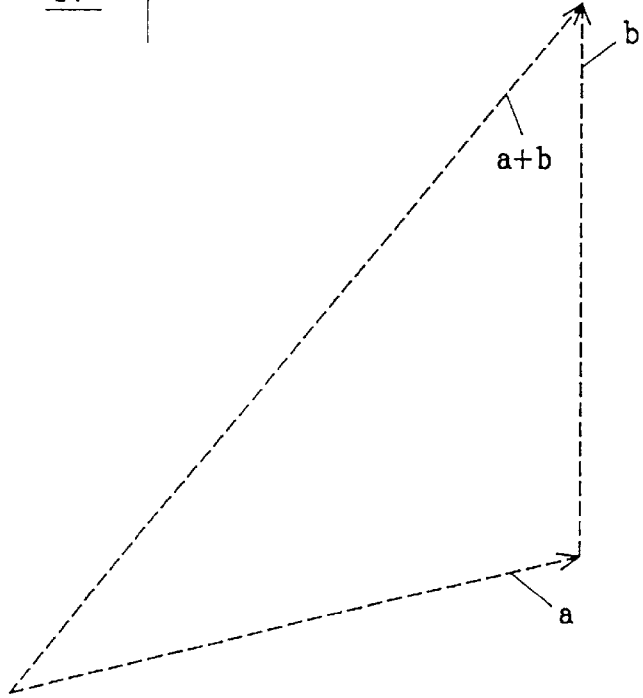
FIG. 5 shows displacement vectors for the image structure according to FIG. 4.

A simple example of an image motif within an individual repeat 1 is shown in FIG. 4. The motif consists of a circular area 15 and a jagged star 16. The circular area 15 lies totally within the interior of the individual repeat 1 and it is therefore not necessary for any part of this motif element to be cut off and displaced. In the case of the jagged star 16 these relationships are different. Parts of this motif element are situated in the regions 7, 13 and 14. For these regions, corresponding to the relationships in Table 1, the displacement vectors a, b and a+b apply. These three vectors a, b and a+b are shown in FIG. 5.

Figure 6:
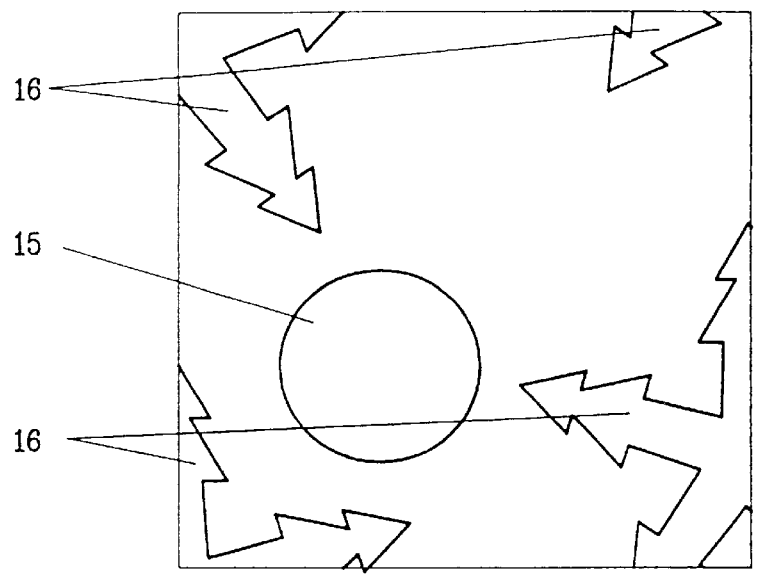
FIG. 6 shows a repeatable individual pattern for the image structure according to FIG. 4.

FIG. 6 shows the repeatable individual pattern obtained by copying and displacing the parts of the motif elements projecting beyond the edges of the individual repeat 1. The parts of the image extending beyond the individual repeat 1 are no longer being shown. This is, therefore, the repeatable individual pattern produced for the addition in the interior of the individual repeat 1. The image motifs are a circle 15, which was already placed completely in the interior of the individual repeat during the draft phase, and a jagged star 16, which initially extended beyond the edges of the individual repeat 1 and has been copied and displaced many times according to the outer regions used by the star. Finally, parts of the image projecting beyond the edges of the individual repeat 1 have been cut off.

Figure 7:
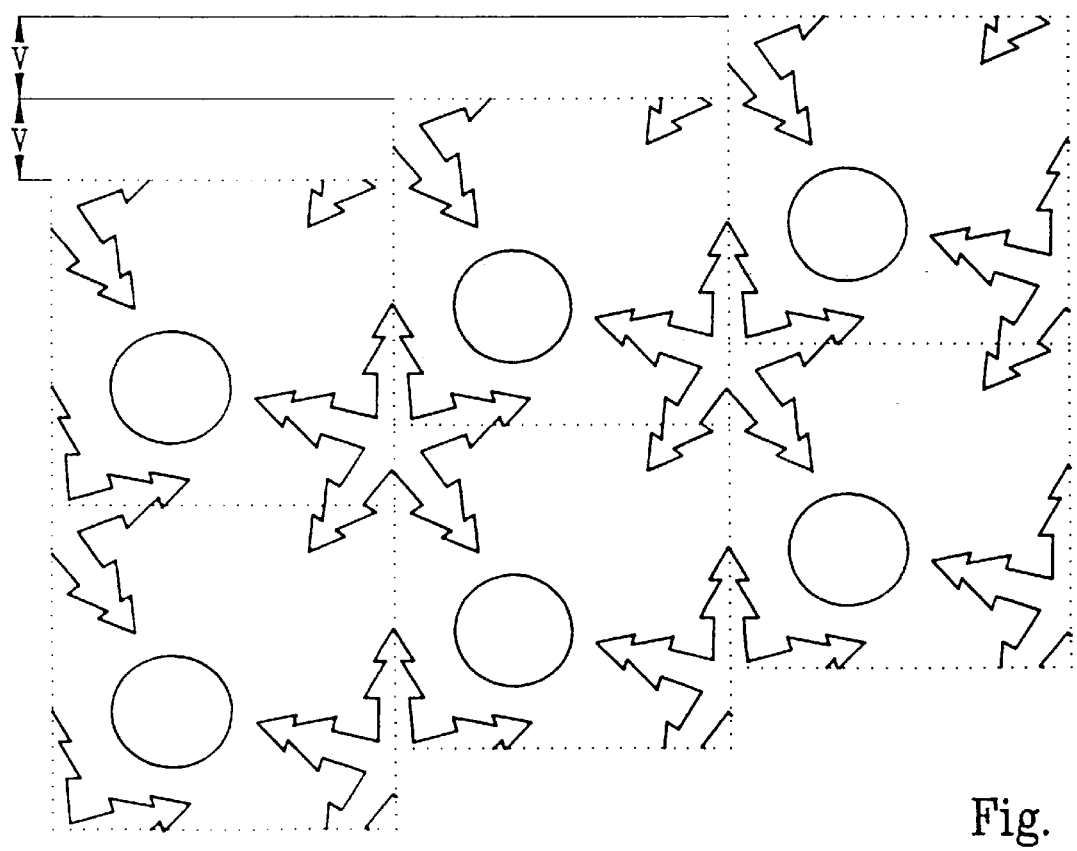
FIG. 7 shows an overall pattern which is composed of a plurality of repeatable individual patterns constructed in accordance with FIG. 6.

FIG. 7 shows the addition image which has been formed from six of the repeatable individual patterns, which are capable of addition, shown in FIG. 6.

A somewhat modified creation of a repeatable individual pattern within an individual repeat 1 will be described by reference to FIGS. 8 to 11. Once again, a rectangle is intended to describe the size and the shape of such an individual repeat 1. The height of the rectangle corresponds to the individual repeat height H and its width to the individual repeat width B. Here, too, the geometrical addition of the individual repeats 1 is intended to be carried out in such a way that in each case an upper edge 4 of an individual repeat 1 is placed against a lower edge 3 of another individual repeat, and likewise a left edge 5 against a right edge 6, but with the left lower corner point 17 of the one individual repeat being pushed away from the lower edge 3 of the other individual repeat by the vertical offset V.

Figure 8:
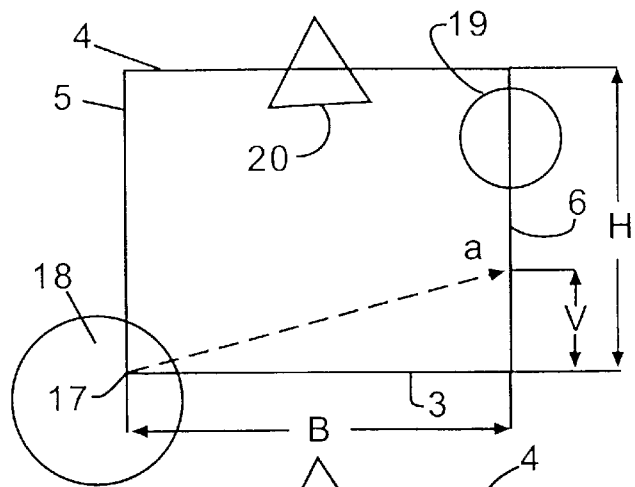
FIG. 8 shows a further individual pattern having a plurality of motifs which reach into adjacent individual repeats.

FIG. 8 shows the motif elements 18, 19 and 20 as they were created in the draft phase. It can be seen that parts of the motif elements 18, 19 and 20 project partially beyond the edges 4, 5 and 6 of the individual repeat 1.

Figure 9:
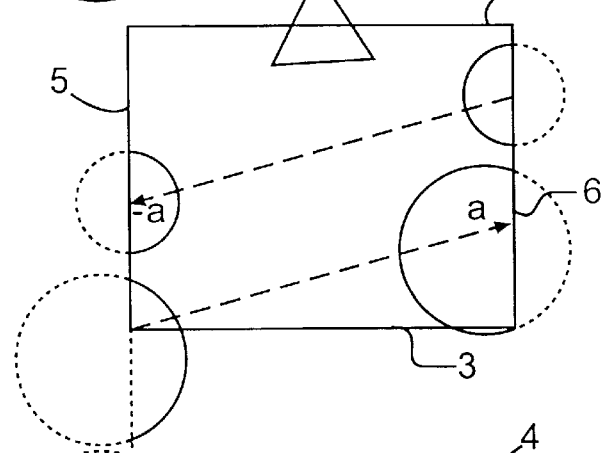
FIGS. 9 and 10 show displacements in different directions of those motif regions which are situated outside the individual repeat in accordance with FIG. 8.

In a first step, shown in FIG. 9, the parts of the motif elements which fall over the left edge 5 are displaced to the right by the vector a, and the parts of the motif elements which fall over the right edge 6 are displaced to the left by the vector −a.

Figure 10:
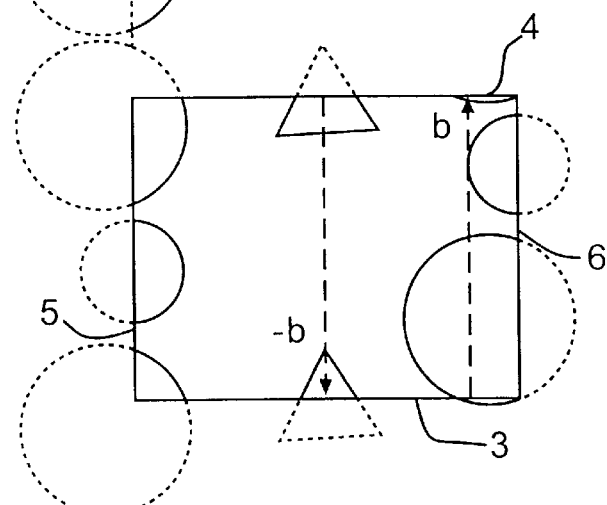

In a further step, shown in FIG. 10, the parts of the motif elements which project beyond the lower edge 3 are now displaced upwards by the vector b, and those parts which are situated over the upper edge 4 are displaced downwards by the vector −b.

Figure 11:
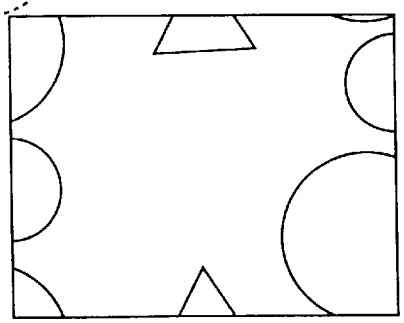
FIG. 11 shows a repeatable individual pattern which is obtained following the displacements.

The result of this treatment of the motif elements can be seen in FIG. 11. The repeatable individual pattern is now capable of geometrical addition, it being necessary to use only the vectors a, b, −a and −b to bring about the geometric addition capability.

Figure 12:
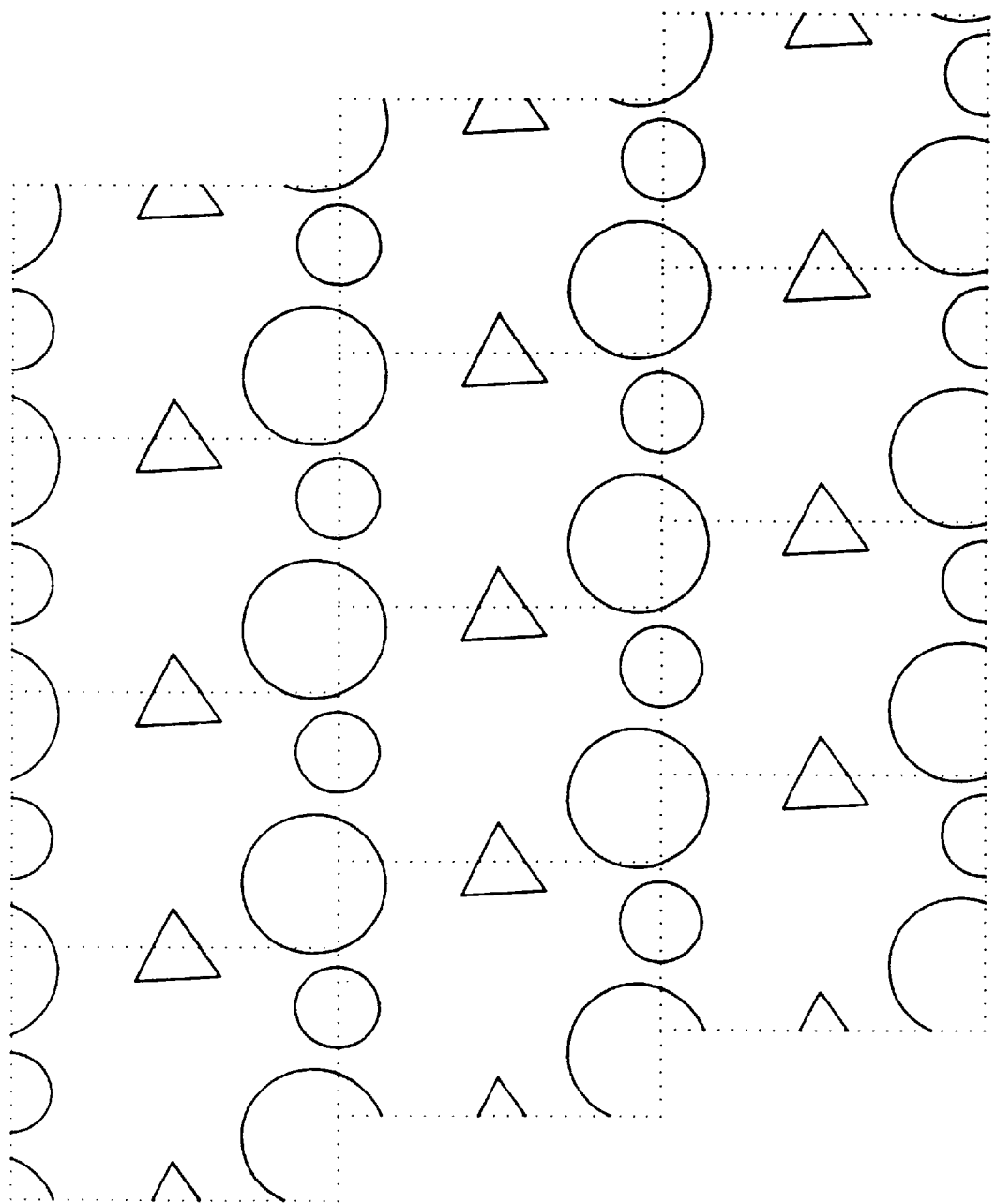
FIG. 12 shows an overall pattern consisting of a plurality of individual patterns according to FIG. 11 which have been joined to one another.

The addition pattern of FIG. 12 shows the addition capability of the individual repeat of FIG. 11. As many individual repeats as desired, filled with the repeatable individual pattern, are joined to one another, in each case displaced by integer multiples of the vectors a and b, without any discontinuity being produced by this addition.

Previously, a rectangle was always presupposed as the basic figure of an individual repeat. By reference to FIGS. 13, 14 and 15 it is shown that the specified processing which can add a repeatable individual pattern can still remain valid in the same way even if a parallelogram or a rhombus is used as the basic figure for an individual repeat.

For this purpose, the vectors a and b must be correctly selected. The vector a is formed of two components. One of these components is that side of the rhombus (or of the rectangle) which, following the addition, coincides completely with one side of an adjacent individual repeat 1. The second component of the vector a is the vertical offset V which would only be situated truly vertically here if the image were to be rotated further a little. The vector b corresponds to another side of the rhombus, this side not being permitted to be situated parallel to that which has already been used as a component for the vector a. It is therefore necessary for that side of the rhombus which is used for the formation of the vector b and the side of the rhombus which is used as a component of the vector a to originate from one corner point of the rhombus.

FIG. 13 shows an individual repeat 1 with an image motif. The motif element 21 projects beyond the edges 4 and 6. FIG. 14 shows the repeatable individual pattern which has been made capable of addition in accordance with the rules previously set up for copying and displacement. FIG. 15 shows the addition of several repeatable individual patterns according to FIG. 14.

Other polygons may also be used as the basic figure for an individual repeat, with the precondition that they are capable of geometrical addition. In general, all these polygons may be traced back to the case of quadrilaterals (rectangles, squares, rhombuses, parallelograms). However, a special case is represented by the regular hexagon since, in its case, three basic vectors must be defined as displacement vectors for the image elements.

Figure 16:
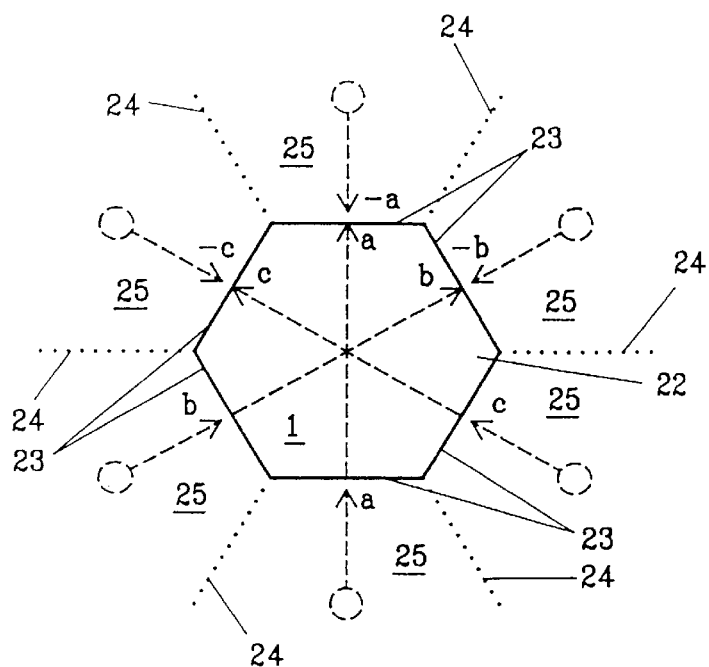
FIG. 16 shows a hexagonal individual repeat.

FIG. 16 shows how the three basic vectors are determined in the case of a regular hexagon 22 and how these have to be assigned to the adjacent regions situated outside the hexagonal individual repeat. These basic vectors originate in each case from the center of one side 23 of the hexagon and point towards the center of the opposite side 23. All image motif parts which fall into the field adjoining the side 23 must be displaced by the vector a, b, c, −a, −b or −c drawn into the respective edge field 25. The edge field 25 is the field adjoining the respective side 23 and is formed by this side 23 and the angle bisector 24 at the two end points of the side 23. An angle bisector 24 divides the angle formed by two mutually abutting sides 23 into two parts of equal size.

Figure 17:
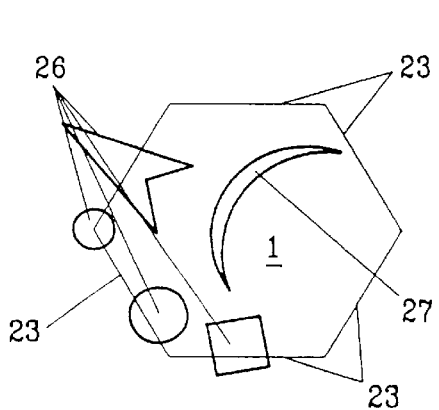
FIG. 17 shows the individual repeat according to FIG. 16 having a plurality of motifs contained therein which extend into adjacent individual repeats.
Figure 18:
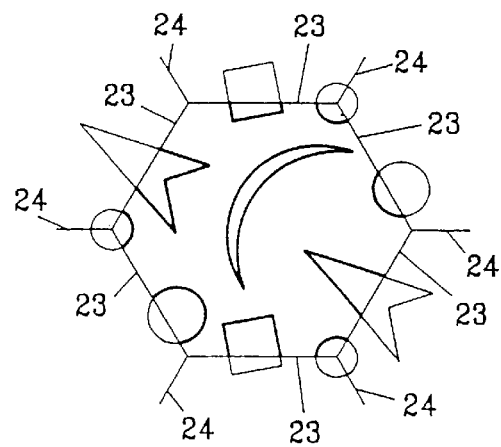
FIG. 18 shows a representation to explain the displacement of those regions of the motifs which extend into adjacent individual repeats.

FIG. 17 shows some motif elements 26 and 27 entered during the drafting into the individual repeat, which is hexagonal here. The motif elements 26 extend beyond sides 23, fall partially into the edge fields 25, and are therefore transferred automatically to the opposite side. FIG. 18 shows an individual repeat 1 with the motif elements 26, 27 already transferred during the draft phase, and FIG. 19 shows an individual pattern produced for the geometrical addition.

Figure 19:
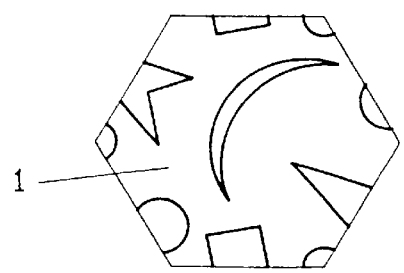
FIG. 19 shows a repeatable individual pattern which is obtained after displacement.
Figure 20:
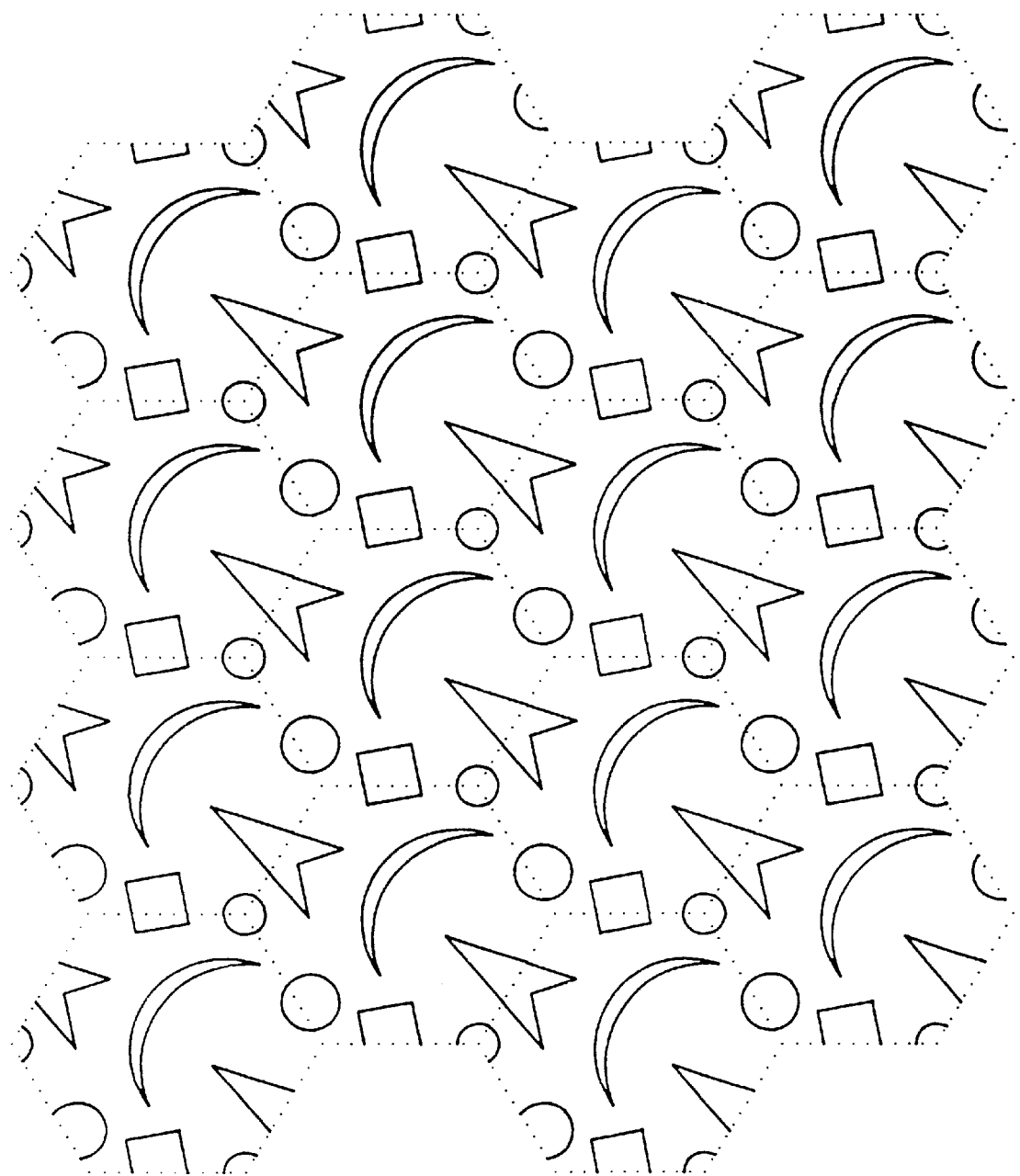
FIG. 20 shows an overall pattern consisting of a plurality of individual patterns according to FIG. 19 which have been put together.

Finally, FIG. 20 shows the overall pattern joined together from the repeatable individual patterns of FIG. 19. It can also be seen from FIG. 20 that the case of the regular hexagon can be traced back to the case of a rhombus (FIGS. 13 to 15) without vertical offset V. This rhombus is defined by four points of the same type (for example the center points) of four closely neighboring, mutually adjacent hexagons. It can readily be seen that these hexagons may not be selected in such a way that all of their center points lie on a straight line.

In principle, it is not even necessary to provide polygons (quadrilaterals, hexagons) for the edge of an individual repeat. Non-linear curves can also be used as the edge of an individual repeat 1. FIGS. 21 to 27 present an example of this case.

Figure 21:
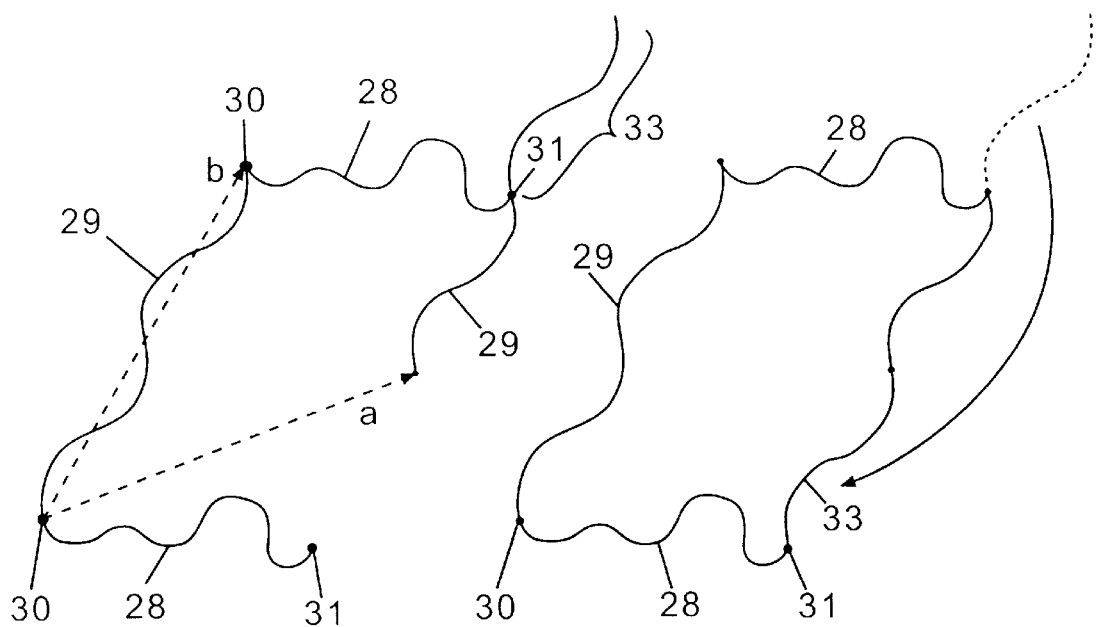
FIG. 21 shows the formation of an individual repeat with a wavy border.

FIG. 21 shows how it is possible to form an individual repeat 1 which is bordered by a non-linear curve and is capable of geometrical addition. First, an arbitrary curve 28 is formed between the points 30 and 31. This curve 28 is then displaced by an arbitrary vector b in order to form the opposite edge. A curve 29, which for the most part is likewise arbitrary, is formed, for which the only limitation is that this curve 29 originates from an end point, for example the end point 30 of the curve 28, and its other end point coincides with the corresponding end point 30 of the second curve 28 arising from the displacement.

Figure 22:
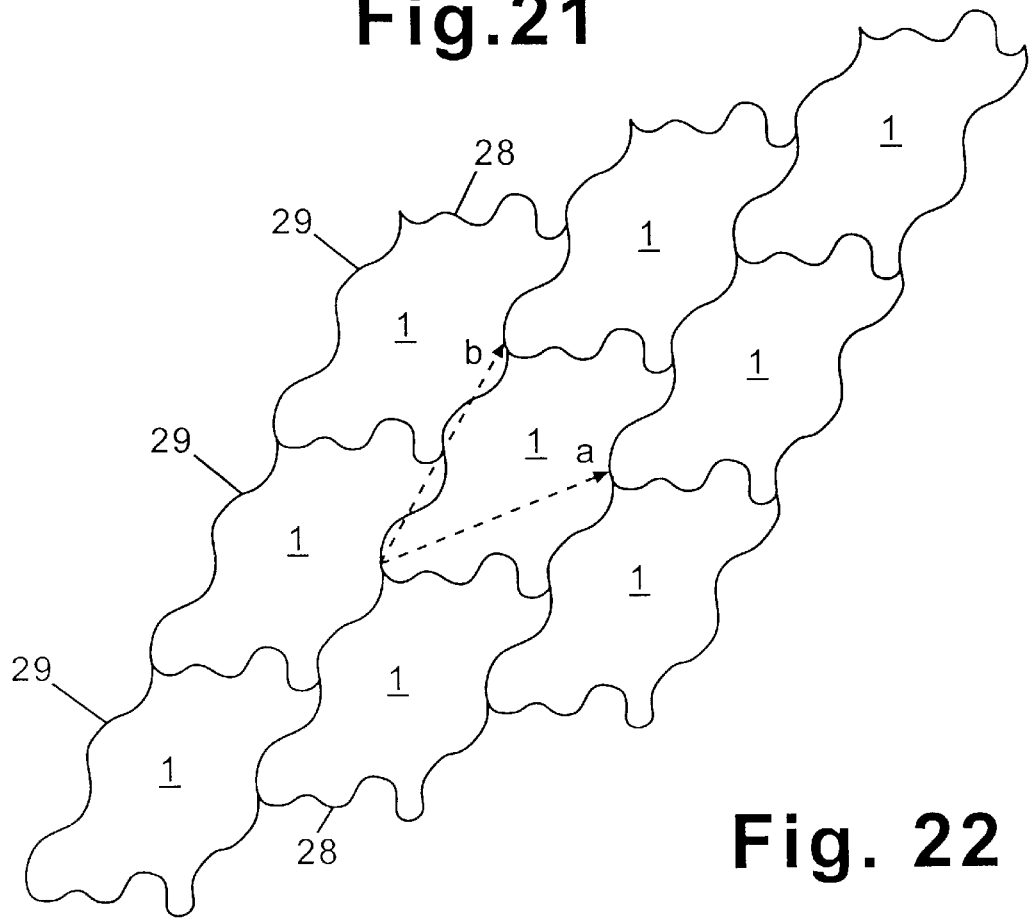
FIG. 22 shows a repeat structure composed of a plurality of individual repeats according to FIG. 21.

The curve 29 is then displaced by a vector a, which for its part may not lie parallel to the vector b. In addition, the vector b must be selected such that one point on the curve 29 coincides with the other end point 31 of the second curve 28. The edge thus formed by the two curves 28 and 29 still does not enclose an areal section without gaps. In order to obtain an individual repeat which is enclosed without gaps by the edge curve, the section of the curve 29 projecting beyond the end point 31 of the upper curve 28 is severed and is displaced with its severed end into the end point 31 of the lower curve 28. The sum of these curves now encloses an areal section which corresponds to an individual repeat 1. FIG. 22 shows the additive image corresponding to this individual repeat, but into which no image motifs have yet been entered.

Figure 23:
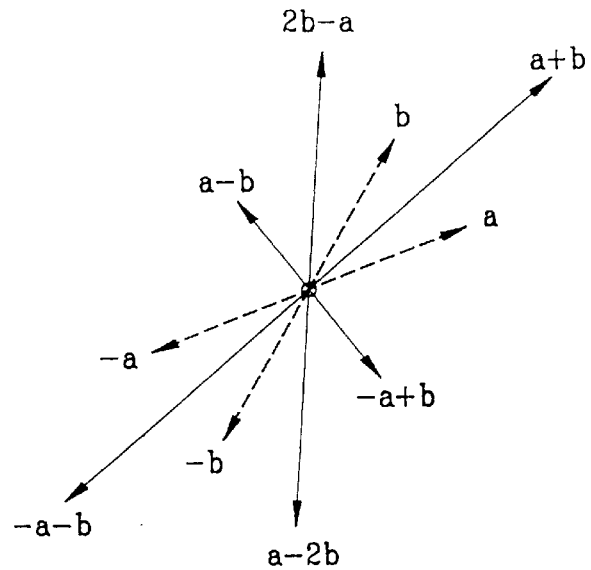
FIG. 23 shows displacement vectors which are associated with the repeat structure according to FIG. 22.

FIG. 23 shows how the derived combination vectors a+b, a−b, b−a, −a−b, a−2b and 2b−a, which are necessary for the correctly-repeating displacement, are formed.

Figure 24:
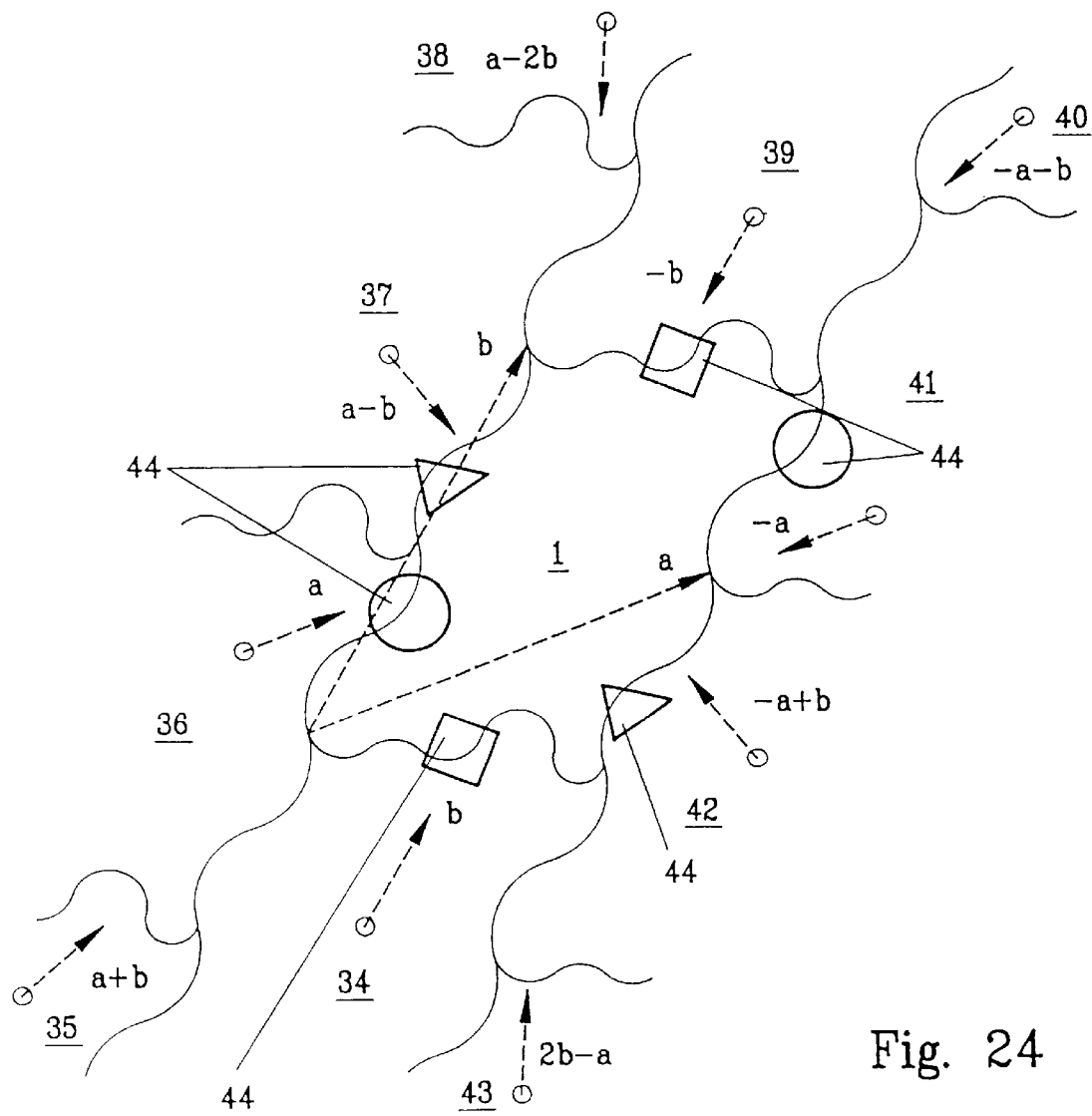
FIG. 24 shows a selected individual repeat having motifs contained therein which reach adjacent individual repeats, as well as the associated displacement vectors.

Shown in FIG. 24 are the edge fields 34 to 43 surrounding an individual repeat 1, and the displacement vectors which are associated with these fields have been plotted. All the motif elements 44 which project beyond the edge of the individual repeat and reach into the edge fields 34 to 43 are copied and displaced by that displacement vector which is associated with the respective edge field.

FIG. 25 illustrates this by reference to some motif elements. A motif element 46 (fish) is completely surrounded by the closed edge curve 45. A motif element 47 (snail shell) projects during the drafting into an edge region 45 defined in FIG. 35 and is therefore immediately displaced by the vector a at the time of drafting. A motif element 48 (star) likewise already projects at the time of drafting into the edge region 45 and is therefore copied and displaced by the vector b. After the production of the draft, only those image points which are within the edge curve 45 are used for the individual repeat. This corresponds to a repeatable individual pattern shown in FIG. 26.

FIG. 27 shows a repeatable individual pattern which has been copied many times, which has been displaced in each case, in a manner corresponding to the geometrical addition, by the vector m.a and n.b, respectively, and thus produces the additive image; in this case, m and n are whole numbers.

Figure 28:
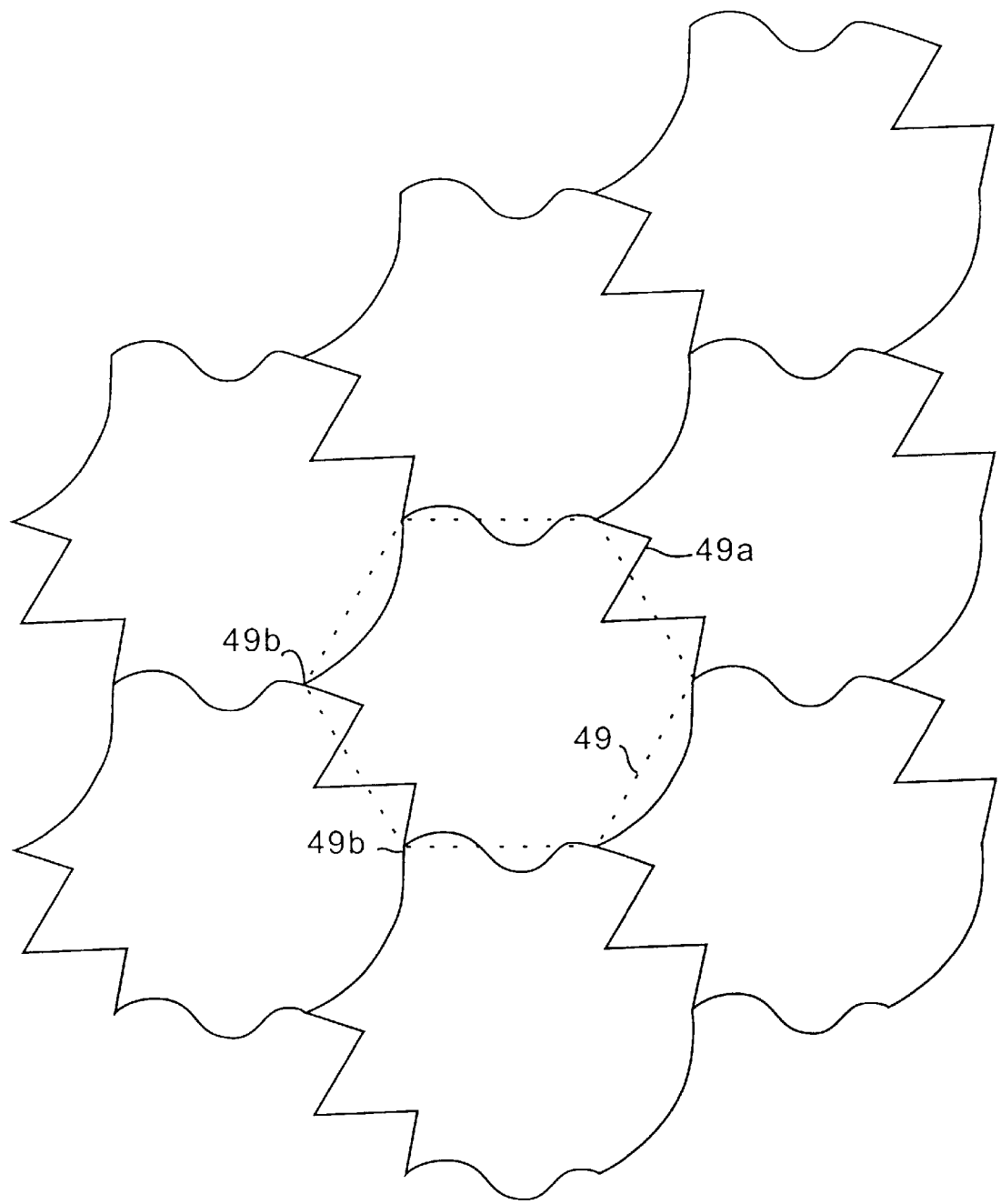
FIG. 28 shows a structure consisting of a plurality of individual repeats with a hexagonal basic structure.

Finally, FIG. 28 shows that it is also possible to construct an individual repeat with any desired bordering curve via a hexagonal individual repeat basic structure. For this purpose, the sides 49 of a regular hexagon have to be replaced by an arbitrary edge curve 49a, but with the starting point and the end point of this edge curve 49a having to coincide with the corresponding points 49b of the replaced hexagon side 49. In addition, the respectively opposite parallel sides of the hexagon must be replaced by the same edge curve.

Figure 29:
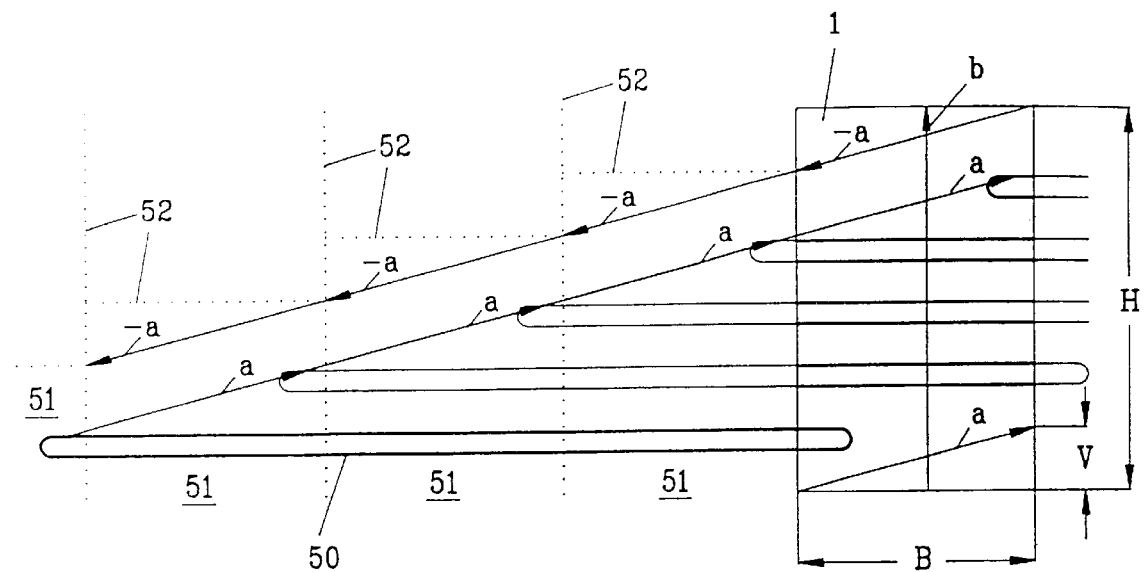
FIG. 29 shows an image structure in which a motif runs through a plurality of individual repeats in only one direction.
Figure 30:
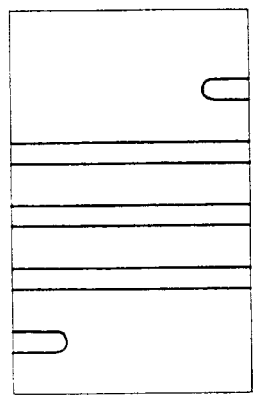
FIG. 30 shows a repeatable individual pattern which is obtained from the image structure according to FIG. 29.
Figure 31:
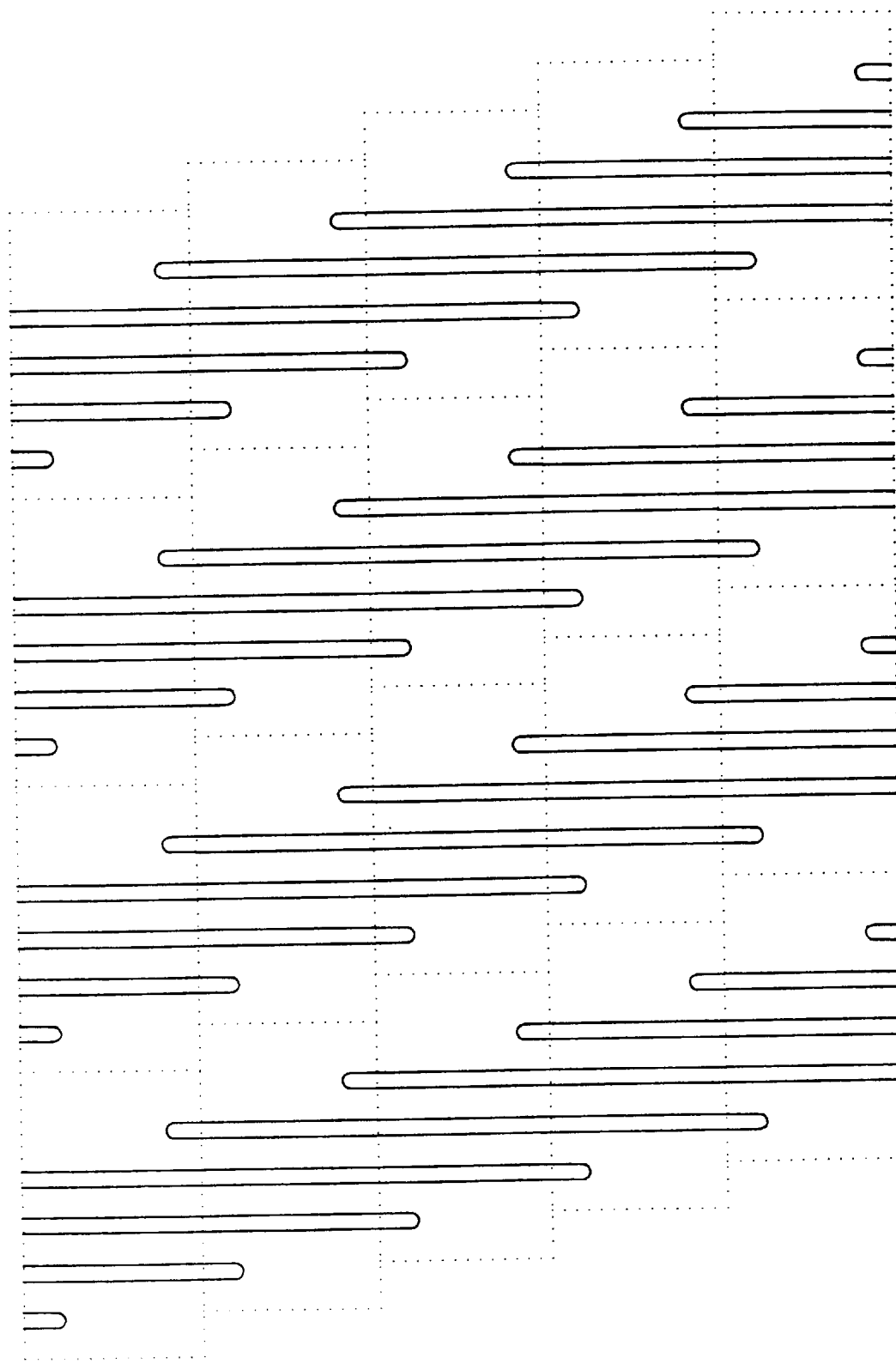
FIG. 31 shows an overall pattern which is formed from a plurality of repeatable individual patterns in accordance with FIG. 30 which have been joined together.

In FIGS. 29 to 31, a motif element 50 has a longitudinal extent which projects by a multiple of B beyond the individual repeat width B of the individual repeat 1. The motif element 50 thus projects into a plurality of neighboring individual repeats 51, which are partially shown and bordered by the dotted lines 52. These neighboring individual repeats 51 have arisen from multiple copying and multiple displacement of the individual repeat 1 in each case by the vector −a. Here, in order to obtain the design content, which is capable of addition, of the individual repeat 1, the regions of the motif element 50 which in each case fall into another individual repeat 51 must be separately transferred back into the individual repeat 1. For this back transfer, it is necessary to use a vector which is of the same size as, but opposite to, that vector which points from the individual repeat 1 to identical points of an individual repeat 51.

FIG. 30 shows the design content (individual pattern) of the individual repeat 1 which has been obtained in this way. FIG. 31 shows a larger extract of the overall pattern obtained by means of the geometrical addition of many repeatable individual patterns. In this case, the vectors a and b, which have already often been described, have been used for the geometrical addition or joining to one another.

Figure 32:
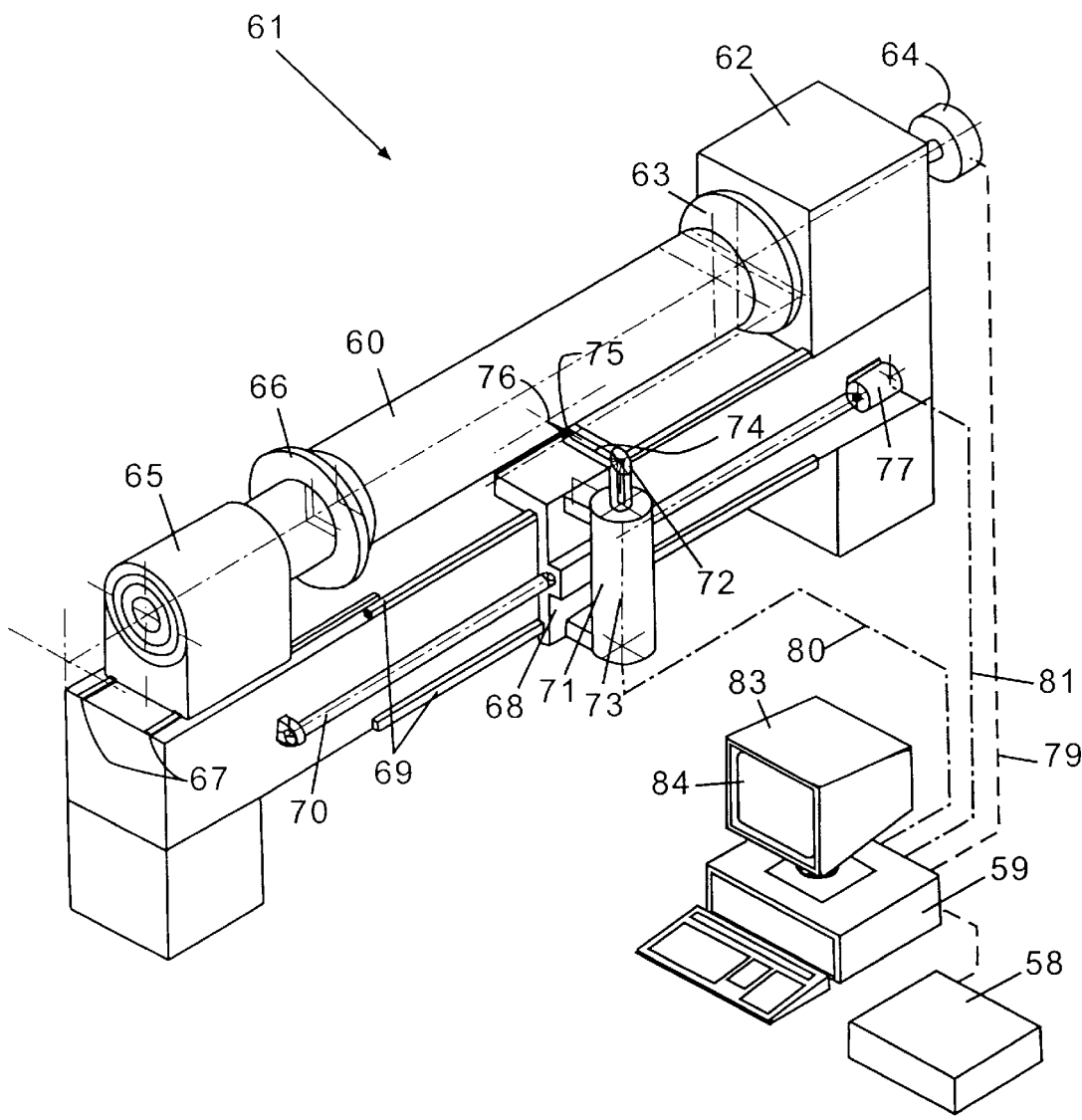
FIG. 32 shows a device for implementing the method according to the invention.

FIG. 32 shows an apparatus on which the processing which has just been described is applied. In principle, the design content which has been formed of at least one individual repeat is stored in digitized form in a large-scale memory 58. The information about the drawing content has previously been transmitted to the control computer 59 via a data network line which is not further shown. A screen stencil 60, whose surface is completely coated with lacquer, has been selected here as the output medium for the overall pattern.

The screen stencil 60 is clamped on a laser engraver 61 between two driving cones 63 and 66. The driving cone 63 on the right-hand side is driven, via a headstock 62, by an electric motor which is not further shown. A pulse transmitter 64, which is connected in a rotationally stiff manner to the right-hand driving cone 63, sends a number of pulses corresponding to the advance of the template in the circumferential direction to the control computer 59 via the pulse line 79. The left-hand driving cone 66 is rotatably mounted in a tailstock 65 and supports the stencil 60 at its other end. The tailstock 65 can be displaced on guides 67 parallel to the longitudinal axis of the stencil 60 and can thus be adjusted to its length.

A slide 68 is moved by means of a spindle 70 on other guides 69, which are likewise arranged parallel to the longitudinal axis of the stencil 60 and are fastened to the machine bed. This slide 68 carries a laser 71 which emits a laser beam 74 in the direction of its axis 73. This laser beam 74 is deflected by a mirror 72. The deflected laser beam 74 is focused by optics 75 onto the surface of the stencil 60. The focal spot 76 obtained in this way has an influence on the lacquer which covers the surface of the stencil 60.

In the case of a long-wavelength thermal radiation emission from the laser 71, the lacquer is removed. If the lacquer is light-sensitive and the wavelength of the laser 71 lies within the sensitivity range of the lacquer, then the lacquer is either cured or damaged, according to its composition. The uncured or damaged points of the lacquer can be dissolved out by a subsequent development process. The exposing of the surface of the stencil 60 has to be carried out in such a way that the tracks formed by the focal point during the rotation of the stencil 60 are situated as close to one another as possible, in order to obtain a patterned image which has as few gaps as possible.

The laser 71, together with the slide 68, is moved by the spindle 70 which is in turn set rotating by a stepping motor 77. The control computer 59 ensures the output of the correct stepping pulses via the line 81, there being present, of course, a pulse converter (not shown any further) which ensures the transformation of the logical stepping pulses into power pulses for the final driving of the stepping motor 77.

The application of the invention is not restricted to the exemplary embodiment latterly indicated. The output of the overall pattern can also be carried out, for example, onto a film to be exposed by a laser diode or else, of course, only on a screen 84 of a monitor 83, so that for example a visual overall impression of the pattern to be generated can be obtained. The monitor 83 is driven by the computer 59.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for forming a pattern comprising the steps of:
   producing a repeatable individual pattern within an individual repeat to generate an overall pattern consisting of a plurality of repeatable individual patterns by transferring regions of motifs which project beyond the individual repeat into the individual repeat to thereby form the repeatable individual pattern; and
   forming the overall pattern by joining the individual repeats containing the repeatable individual pattern to one another, thereby reforming the original motifs.

2. The method according to claim 1, further comprising:
   forming at least one vector by starting from any arbitrarily selected point within a first individual repeat, which points towards the identical point of other individual repeats, into which motifs project which are partly situated in the first individual repeat and
   displacing, in a direction opposite to the respective vector direction, a portion of a motif which is situated in the other individual repeats by the respective vector magnitude, thereby forming the repeatable individual pattern.

3. The method according to claim 2, wherein said displacing step includes displacing said portion in a direction opposite to the respective vector direction in a plurality of steps.

4. The method according to claim 2, wherein respective displacing steps are executed in different directions.

5. The method according to claim 2, wherein respective displacing steps are executed in the same direction.

6. The method according to claim 1, further comprising creating the repeatable individual pattern on a screen of a monitor using an electronic computer and temporarily storing in an electronic memory.

7. The method according to claim 6, wherein said forming step, includes reading out the individual repeats containing the repeatable individual pattern repeatedly from the electronic memory to form the overall pattern.

8. The method according to claim 7, further comprising transferring the individual repeats into a stencil blank in order to form the overall pattern therein.

9. The method according to claim 8, wherein said transferring step includes exposing a light sensitive layer on the stencil blank.

10. The method according to claim 9, wherein said exposing step includes switching a beam from a laser on and off in coincidence with the image data of the individual repeat stored in the electronic memory.

11. The method according to claim 9, wherein said exposing step is carried out via a film into which the overall pattern, consisting of a plurality of individual repeats, has previously been transferred.

12. The method according to claim 1, wherein the step of producing further comprises the steps of:

forming at least one motif having a portion within the individual repeat and a portion projecting beyond the individual repeat; and transferring the portion projecting beyond the individual repeat to another location within the individual repeat to form the repeatable individual pattern.

13. The method according to claim 2, wherein the step of displacing further comprises:

displacing the portion of the motif which is situated in the other individual repeats to another location within the first individual repeat to form the repeatable individual pattern.

14. The method according to claim 1, wherein the regions of the motifs which project beyond the individual repeat project a multiple of a width of the individual repeat.

15. The method according to claim 1, wherein the individual repeat is bordered by a non-linear curve and a plurality of non-linear curves containing the repeatable individual pattern are joined together to form the original motifs.

16. The method according to claim 1, wherein the individual repeat is bordered by a hexagon and a plurality of hexagons containing the repeatable individual pattern are joined together to form the original motifs.

17. A system for forming a pattern comprising:

means for producing a repeatable individual pattern within an individual repeat to generate an overall pattern consisting of a plurality of repeatable individual patterns by transferring regions of motifs which project beyond the individual repeat into the individual repeat to thereby form the repeatable individual pattern; and means for forming the overall pattern by joining the individual repeats containing the repeatable individual pattern to one another, thereby reforming the original motifs.

18. The system according to claim 17, further comprising:

means for forming at least one vector by starting from any arbitrarily selected point within a first individual repeat, which points towards the identical point of other individual repeats, into which motifs project which are partly situated in the first individual repeats; and means for displacing, in a direction opposite to the respective vector direction, a portion of a motif which is situated in the other individual repeats by the respective vector magnitude, thereby forming the repeatable individual pattern.

19. The system according to claim 18, wherein respective displacements are executed in different directions by the displacing means.

20. The system according to claim 18, wherein respective displacements are executed in the same direction by the displacing means.

21. The system according to claim 17, further comprising means for displaying the repeatable individual pattern on a screen of a monitor using an electronic computer and temporarily storing the repeatable individual pattern in an electronic memory.

22. The system according to claim 21, wherein said means for forming includes means for reading out the individual repeats containing the repeatable individual pattern repeatedly from the electronic memory to form the overall pattern.

23. The system according to claim 22, further comprising means for transferring the individual repeats into a stencil blank in order to form the overall pattern therein.

24. The system according to claim 23, wherein said means for transferring includes means for exposing a light sensitive layer on the stencil blank.

25. The method according to claim 24, wherein said means for exposing step includes means for switching a beam from a laser on and off in coincidence with the image data of the individual repeat stored in the electronic memory.

26. The system according to claim 17, wherein the means for producing forms at least one motif having a portion within the individual repeat and a portion projecting beyond the individual repeat, and transfers the portion projecting beyond the individual repeat to another location within the individual repeat to form the repeatable individual pattern.

27. The system according to claim 26, wherein the means for displacing displaces the portion of the motif which is situated in the other individual repeats to another location within the first individual repeat to form the repeatable individual pattern.

28. The system according to claim 17, wherein the regions of the motifs which project beyond the individual repeat project a multiple of a width of the individual repeat.

29. The system according to claim 17, wherein the individual repeat is bordered by a non-linear curve and a plurality of non-linear curves containing the repeatable individual pattern are joined together to form the original motifs.

30. The system according to claim 17, wherein the individual repeat is bordered by a hexagon and a plurality of hexagons containing the repeatable individual pattern are joined together to form the original motifs.

* * * * *